US009467636B2

(12) United States Patent
Nakamura et al.

(10) Patent No.: US 9,467,636 B2
(45) Date of Patent: Oct. 11, 2016

(54) PHOTOELECTRIC CONVERSION DEVICE AND IMAGING SYSTEM

(71) Applicant: CANON KABUSHIKI KAISHA, Tokyo (JP)

(72) Inventors: Kohichi Nakamura, Kawasaki (JP); Koichiro Iwata, Kawasaki (JP); Kazuhiro Saito, Tokyo (JP); Takeshi Akiyama, Yokohama (JP); Tetsuya Itano, Sagamihara (JP); Hiroki Hiyama, Sagamihara (JP); Takashi Muto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 244 days.

(21) Appl. No.: 14/043,473

(22) Filed: Oct. 1, 2013

(65) Prior Publication Data

US 2014/0098272 A1    Apr. 10, 2014

(30) Foreign Application Priority Data

Oct. 5, 2012 (JP) ................................ 2012-223307

(51) Int. Cl.
H04N 5/335 (2011.01)
H04N 5/3745 (2011.01)
H04N 5/376 (2011.01)
H04N 5/378 (2011.01)

(52) U.S. Cl.
CPC .......... *H04N 5/37455* (2013.01); *H04N 5/378* (2013.01); *H04N 5/3765* (2013.01); *H04N 5/37452* (2013.01)

(58) Field of Classification Search
USPC ........................................................ 348/308
See application file for complete search history.

(56) References Cited

U.S. PATENT DOCUMENTS

| 2002/0101526 | A1* | 8/2002 | Hamaguchi ................... 348/294 |
| 2005/0231624 | A1* | 10/2005 | Muramatsu et al. ......... 348/311 |
| 2007/0186124 | A1* | 8/2007 | Streibl et al. ................. 713/400 |
| 2009/0084941 | A1* | 4/2009 | Muramatsu et al. ...... 250/208.1 |
| 2012/0008033 | A1* | 1/2012 | Hisamatsu ................... 348/308 |
| 2012/0119067 | A1 | 5/2012 | Sohn |

FOREIGN PATENT DOCUMENTS

| CN | 1694491 A | 11/2005 |
| JP | 2010-258806 A | 11/2010 |
| JP | 2011-166197 A | 8/2011 |
| JP | 2011-234326 A | 11/2011 |

* cited by examiner

*Primary Examiner* — Roberto Velez
*Assistant Examiner* — Stephen Coleman
(74) *Attorney, Agent, or Firm* — Canon USA, Inc. IP Division

(57) ABSTRACT

A photoelectric conversion device includes a plurality of pixels arranged in a plurality of columns, a plurality of comparators provided correspondingly to the respective columns, a reference signal generation unit configured to supply a reference signal to the plurality of comparators, a counter configured to generate a count signal that includes a plurality of bits in synchronization with a first clock signal, a synchronization unit configured to synchronize the plurality of bits with a second clock signal to generate a synchronized count signal and to output the generated synchronized count signal, and a plurality of memories provided correspondingly to the respective comparators, the memories each being configured to store the synchronized count signal in response to a change in an output of a corresponding one of the comparators.

19 Claims, 17 Drawing Sheets

PHOTOELECTRIC CONVERSION DEVICE AND IMAGING SYSTEM

BACKGROUND

1. Technical Field

The present disclosure relates to a photoelectric conversion device and an imaging system.

2. Description of the Related Art

A solid-state image sensor is known in which analog-to-digital (AD) converters are provided for respective columns in a pixel array that includes pixels arranged in a matrix. Japanese Patent Application Laid-Open No. 2011-166197 discusses a technique in which each AD converter includes a counter circuit, and a plurality of clock signals which are out of phase with one another is supplied to each counter. The technique discussed in Japanese Patent Application Laid-Open No. 2011-166197 employs, in order to reduce a duty deviation in each clock signal, a configuration that includes a primary transmission line, in which a plurality of repeat buffers is connected in series, and a secondary transmission line, in which a plurality of repeat buffers is connected in series, provided in a transmission unit of the clock signals. In such a configuration, the secondary transmission line branches off from the primary transmission line.

However, the configuration discussed in Japanese Patent Application Laid-Open No. 2011-166197 may not be able to suppress a duty deviation in clock signals to a sufficient level.

Further, the configuration in which the counter circuit is shared by the plurality of AD converters may also lead to the issue of a duty deviation.

Solving at least one of the issues discussed above is beneficial.

SUMMARY

According to an aspect of the present invention, a photoelectric conversion device includes a plurality of pixels arranged in a plurality of columns, a plurality of comparators provided correspondingly to the respective columns, a reference signal generation unit configured to supply a reference signal to the plurality of comparators, a counter configured to generate a count signal that includes a plurality of bits in synchronization with a first clock signal, a synchronization unit configured to synchronize the plurality of bits with a second clock signal to generate a synchronized count signal and to output the generated synchronized count signal, and a plurality of memories provided correspondingly to the respective comparators, the memories each being configured to store the synchronized count signal in response to a change in an output of a corresponding one of the comparators.

According to another aspect of the present invention, a photoelectric conversion device includes a plurality of pixels arranged in a plurality of columns, a plurality of comparators provided correspondingly to the respective columns, a reference signal generation unit configured to supply a reference signal to the plurality of comparators, a plurality of digital signal generation units provided correspondingly to the respective comparators, a clock signal generation unit configured to generate a plurality of clock signals that are out of phase with one another, and a synchronization unit configured to synchronize the plurality of clock signals with a second clock signal to generate a plurality of synchronized clock signals and to output the generated synchronized clock signals. Each of the plurality of digital signal generation units includes a counter configured to carry out a count operation in response to the plurality of synchronized clock signals.

Further features of the present invention will become apparent from the following description of embodiments with reference to the attached drawings.

DESCRIPTION OF THE EMBODIMENTS

Figure 1:
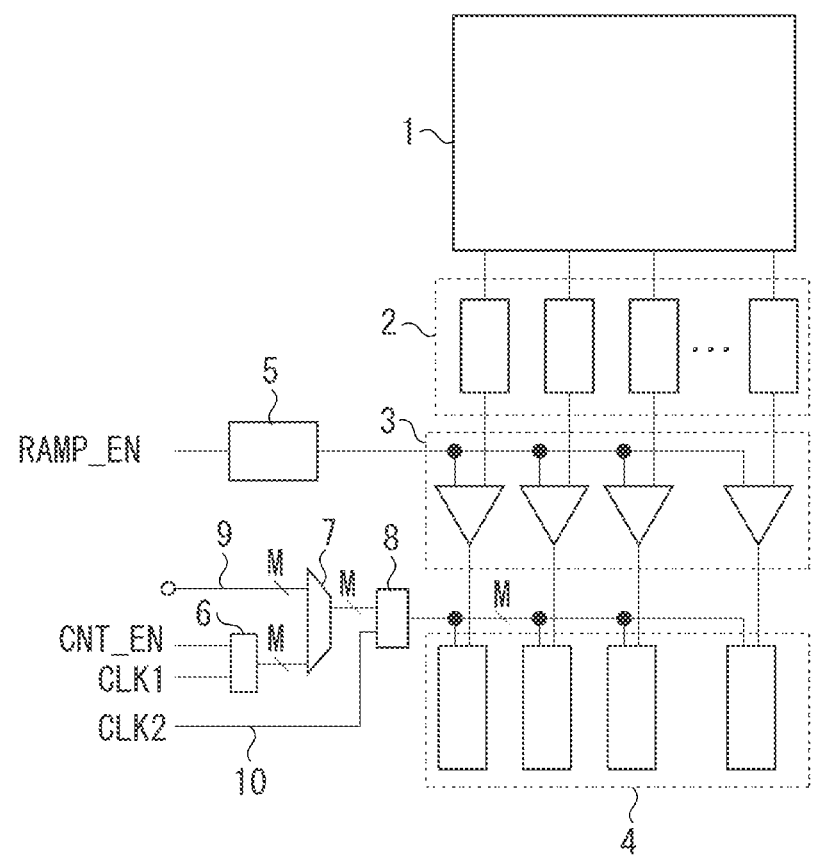
FIG. 1 illustrates a configuration of a photoelectric conversion device.

FIG. 1 is a block diagram illustrating a configuration of a photoelectric conversion device according to a first embodiment. The photoelectric conversion device includes a pixel array 1, a read unit group 2, a comparison unit group 3, a memory unit group 4, a reference signal generation unit 5, a counter 6, a selection unit 7, and a synchronization unit 8.

The pixel array 1 includes a plurality of pixels that are arranged in a plurality of columns. The read unit group 2 includes a plurality of read units provided correspondingly to the respective columns in the pixel array 1. The comparison unit group 3 includes a plurality of comparators provided correspondingly to the respective read units. The memory unit group 4 includes a plurality of memory units provided correspondingly to the respective comparators. The reference signal generation unit 5 outputs, in response to an input of a ramp enable signal RAMP_EN, a reference signal having a signal level that varies with time. The counter 6, in response to a count enable signal CNT_EN, counts a first clock signal CLK1 and outputs an M bit count signal. The selection unit 7 outputs selectively one of the count signal output from the counter 6 and M bit digital data 9 to the synchronization unit 8. The digital data 9 is provided from a data supply unit (not illustrated). The synchronization unit 8 synchronizes an M bit signal output from the selection unit 7 with a second clock signal CLK2 and outputs a synchronized count signal. The memory units in each column store an output from the synchronization unit 8 with a change in an output from a corresponding one of the comparison units serving as a trigger.

Figure 2:
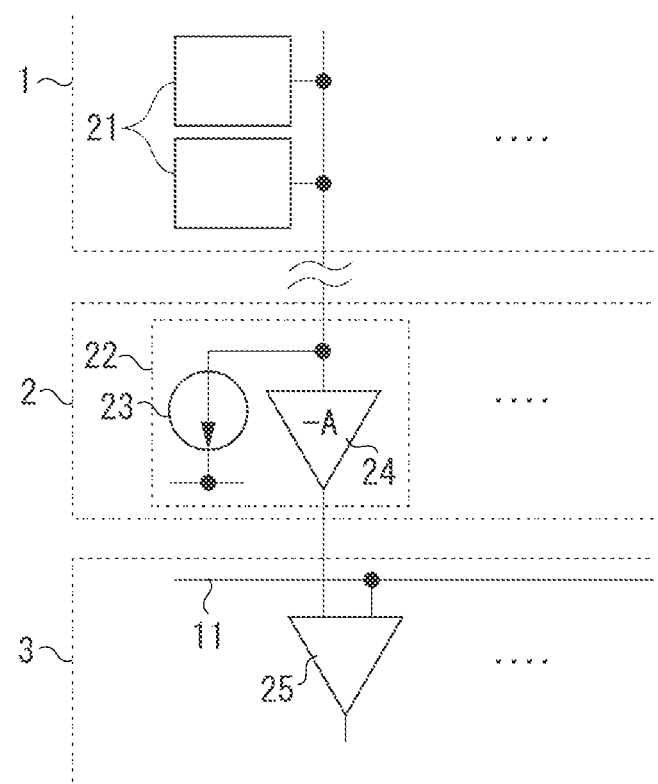
FIG. 2 illustrates a configuration of a portion of the photoelectric conversion device.

FIG. 2 is a block diagram illustrating a configuration example of the pixel array 1, the read unit group 2, and the comparison unit group 3 arranged in one of the columns. The pixel array 1 includes a plurality of pixels 21 that are connected to a single read unit 22. The read unit 22, for example, includes a constant current source 23 and an amplifier 24. If the pixels 21 include an amplification transistor, the constant current source 23 and the amplification transistor collectively constitute a source follower circuit. The amplifier 24 may be an inverting amplifier circuit that provides a minus-A-fold gain to a signal output from the pixels 21, as illustrated in FIG. 2, or may be a non-inverting amplifier circuit that provides a positive gain. Alternatively, the amplifier 24 may be a buffer circuit that carries out only buffering. The read unit 22 may further include a noise reduction circuit for reducing a noise component contained in a signal output from the pixels 21. An output of the amplifier 24 is provided to a comparator 25 as an output of the read unit 22.

Figure 3:
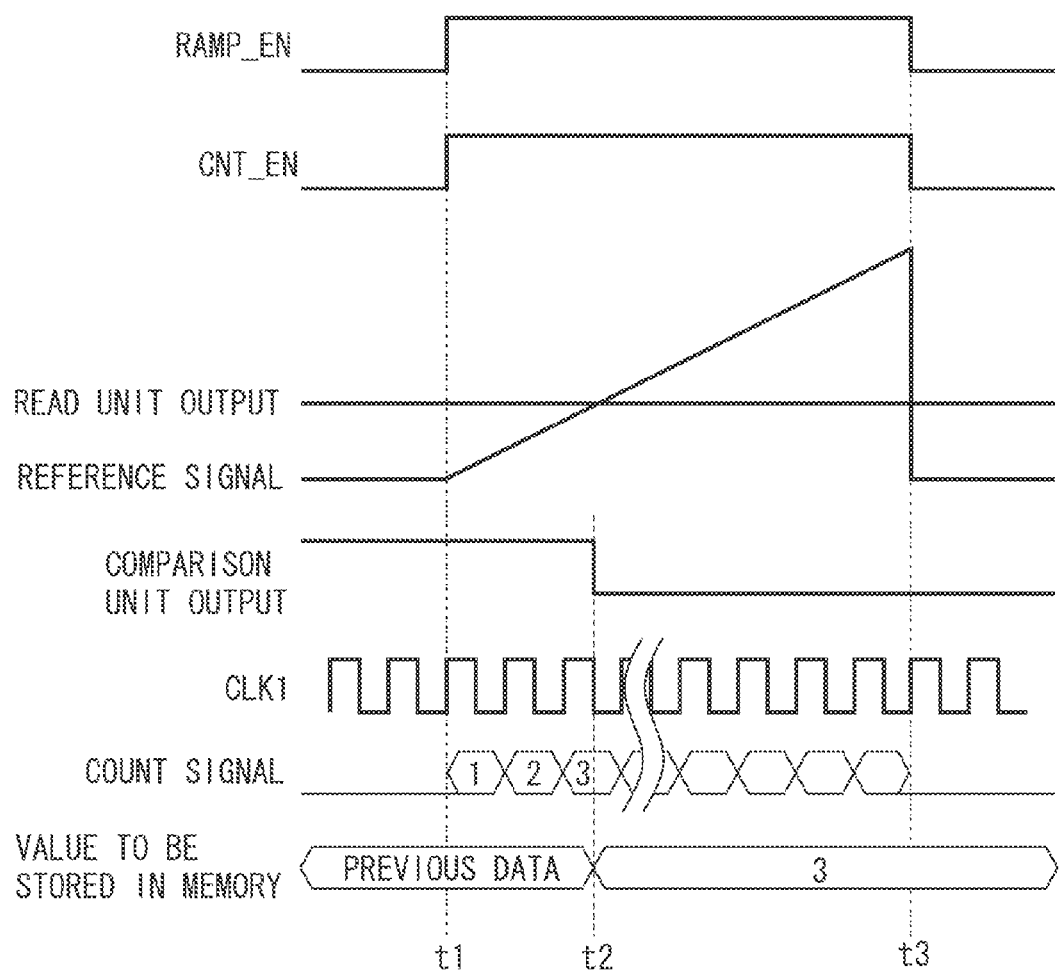
FIG. 3 is a timing chart illustrating operations of the photoelectric conversion device.

FIG. 3 is a timing chart for describing operations of the photoelectric conversion device illustrated in FIG. 1. To simplify the description, a value of a count signal output from the counter 6 is indicated in decimal notation, but in reality, a count signal is output as an M bit signal. Further, during a period spanning from a time t1 to a time t3, the selection unit 7 is set to supply a count signal output from the counter 6 to the memory unit group 4.

Prior to the time t1, the read unit group 2 provides an analog signal to be converted into a digital signal to the comparison unit group 3. At the time t1, a ramp enable signal RAMP_EN and a count enable signal CNT_EN each change to an H level. Thus, an output of the reference signal generation unit 5 starts changing with time, and the counter 6 starts a count operation of the first clock signal CLK1. According to the present embodiment, the count value is incremented at each rise of the first clock signal CLK1. The reference signal may change linearly with time or may change stepwise.

As a level relationship between the output of the read unit 22 and the reference signal is reversed at the time t2, the output of the comparator 25 changes to an L level from the H level, and the memory unit stores the count signal at this time. The count signal stored at this time is a digital signal that corresponds to an analog signal output from the read unit 22.

Thereafter, the level of the reference signal continues to change until the time t3, and then the output of the reference signal is reset.

If an analog signal to be converted does not fall within a dynamic range that allows AD conversion, the output of the comparator 25 does not change until the time t3. In this case, data at a point prior to the time t1 is stored in the memory unit of this column, which results in an abnormal value. Thus, after the time t3, the selection unit 7 is controlled to supply the digital data 9, instead of the count signal, to the memory unit, and thus the digital data 9 is stored in the memory unit. The digital data 9 holds a predetermined value and, for example, is a digital signal that corresponds to a maximum value that allows AD conversion.

Thereafter, the digital signal stored in the memory unit group 4 is output to a later-stage circuit via a column selection unit (not illustrated).

Figure 4:
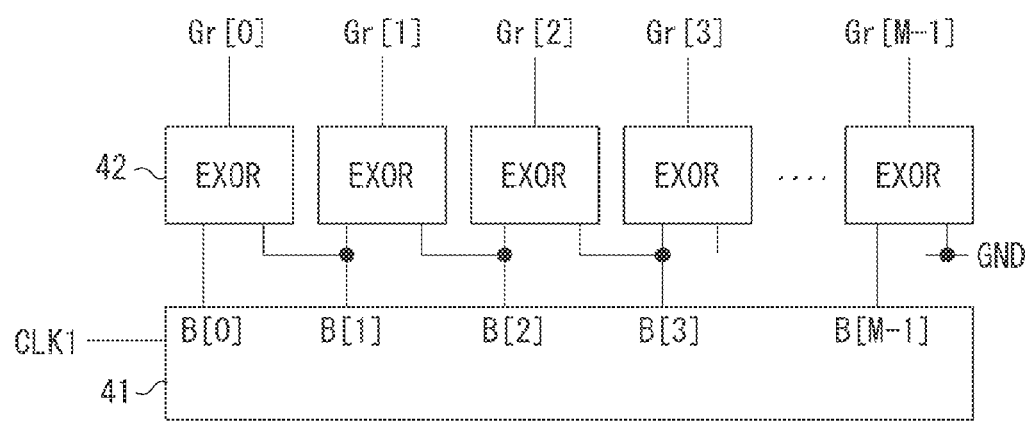
FIG. 4 illustrates a configuration of a counter.

A configuration of a gray code counter circuit that carries out an M bit output ranging from Gr[0] to Gr[M−1] is illustrated in FIG. 4 as a configuration example of the counter 6. The gray code counter circuit includes an M bit binary counter circuit 41 and M pieces of exclusive OR (EXOR) circuits 42. The binary counter circuit 41 carries out a count operation in response to an input of the first clock signal CLK1. Each of the EXOR circuits 42 in the gray code counter circuit, except for the one that outputs the most significant bit Gr[M−1], takes, from among the outputs of the binary counter circuit 41, outputs of two adjacent bits as an input and outputs one bit. More specifically, an EXOR circuit 42 takes outputs B[n] and B[n+1] of the binary counter circuit 41 as an input and generates an output Gr[n] of the gray code counter circuit (here, n is a natural number). The EXOR circuit 42 that outputs the most significant bit Gr[M−1] is connected to an output B[M−1] and the ground (GND).

Figure 5:
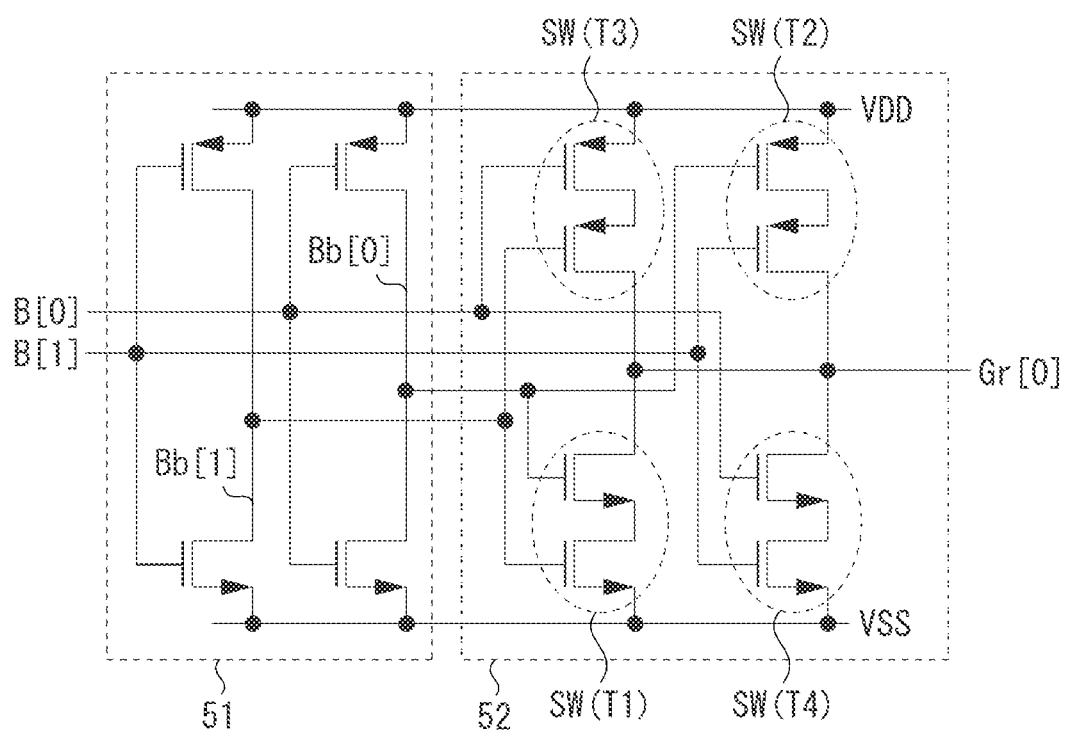
FIG. 5 illustrates a configuration of an exclusive OR (EXOR) circuit.

The configuration of the EXOR circuit 42 is illustrated in FIG. 5 with the least significant bit Gr[0] serving as an example. The EXOR circuit 42 includes an inverter circuit unit 51 and a switch circuit unit 52. The inverter circuit unit 51 includes two inverter circuits, and upon receiving signals B[0] and B[1], the two inverter circuits output inverted signals Bb[0] and Bb[1], respectively.

The switch circuit unit 52 includes four switch units SW(T1) to SW(T4). In the switch unit SW(T1), a negative-channel metal oxide semiconductor (NMOS) transistor that is controlled through the inverted signal Bb[0] and another NMOS transistor that is controlled through the inverted signal Bb[1] are connected in series. In the switch unit SW(T2), a positive-channel metal oxide semiconductor (PMOS) transistor that is controlled through the inverted signal Bb[0] and another PMOS transistor that is controlled through the signal B[1] are connected in series. In the switch unit SW(T3), a PMOS transistor that is controlled through the signal B[0] and another PMOS transistor that is controlled through the inverted signal Bb[1] are connected in series. In the switch unit SW(T4), an NMOS transistor that is controlled through the signal B[0] and another NMOS transistor that is controlled through the signal B[1] are connected in series.

Among the switch units SW(T1) to SW(T4), the switch unit SW(T3) and the switch unit SW(T1) are connected in series, and a common node thereof is connected to an output node Gr[0] of the EXOR circuit 42. Similarly, the switch unit SW(T2) and the switch unit SW(T4) are connected in series, and a common node thereof is connected to the output node Gr[0] of the EXOR circuit 42.

Figure 6:
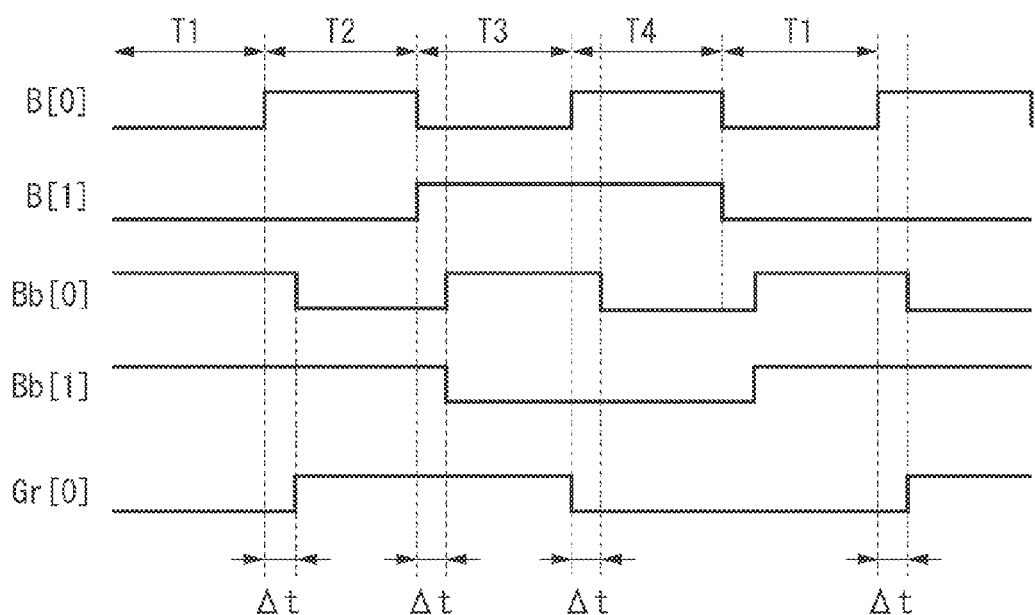
FIG. 6 is a timing chart illustrating operations of the EXOR circuit.

Subsequently, the operation of the EXOR circuit 42 will be described with reference to FIG. 6. A delay generated in each inverter circuit in the inverter circuit unit 51 is designated by Δt.

The outputs B[0] and B[1] of the binary counter circuit 41 change at a frequency that is half the frequency of the output B[0]. States of the outputs B[0] and B[1] in each of periods T1 to T4 will now be described.

In the period T1, the outputs B[0] and B[1] are both at the L level. At this point, the inverted signals Bb[0] and Bb[1] are both at the H level, and the switch unit SW(T1) is turned on. Thus, the output Gr[0] of the EXOR circuit 42 is at the L level.

In the period T2, the output B[0] changes to the H level, and the output B[1] remains at the L level. The inverted signal Bb[0] changes to the L level along with the transition of the output B[0], but this transition of the inverted signal Bb[0] is delayed by a delay time Δt which is caused by an inverter circuit. Since the switch unit SW(T2) is turned on in the period T2, the output Gr[0] of the EXOR circuit 42 changes to the H level with the delay time Δt relative to the transition of the signal B[0].

In the period T3, the output B[0] changes back to the L level, and the output B[1] changes to the H level. The inverted signals Bb[0] and Bb[1] each make a transition with a delay time Δt relative to the transition of the outputs B[0] and B[1]. Since the switch unit SW(T3) is turned on in the period T3, the output Gr[0] of the EXOR circuit 42 remains at the H level.

In the period T4, the output B[0] changes to the H level, and the output B[1] remains at the H level. The inverted signal Bb[0] makes a transition with a delay time Δt relative to the transition of the signal B[0]. Since the switch unit SW(T4) is turned on in the period T4, the output Gr[0] of the EXOR circuit 42 changes to the L level.

As can be appreciated from the preceding description, the output Gr[0] of the EXOR circuit 42 is delayed by Δt when making a transition from the L level into the H level, but a delay does not occur when the output Gr[0] makes a transition from the H level into the L level. As a result, duration in which the output Gr[0] is at the H level is shorter than duration in which the output Gr[0] is at the L level, and thus the duty ratio is not 50%. In other words, a duty deviation occurs.

Figure 7:
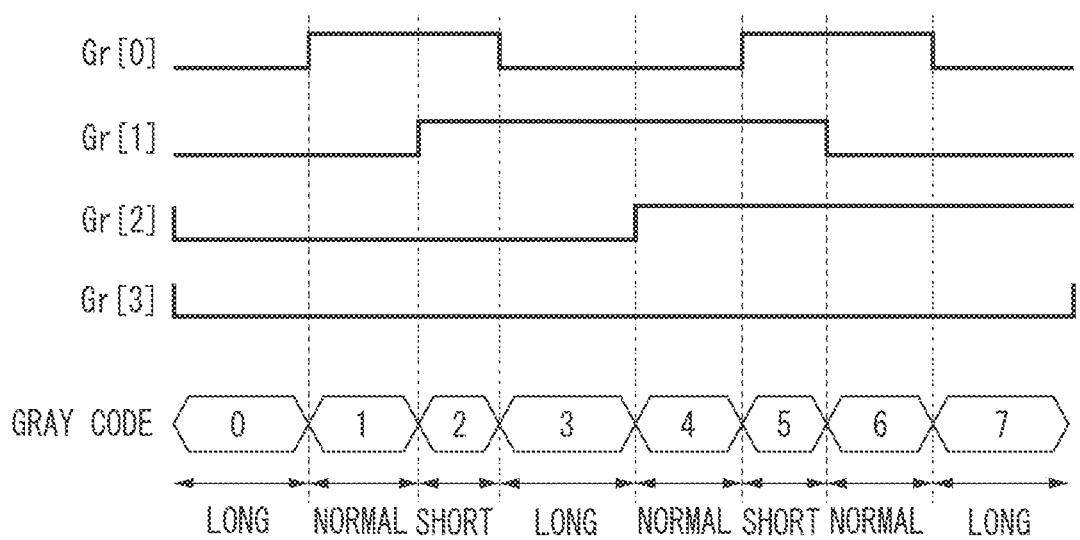
FIG. 7 is a timing chart for describing a duty deviation in a gray code counter circuit.

FIG. 7 illustrates a timing chart in a case where such a duty deviation occurs in each bit in a four bit gray code counter circuit.

When a gray code is defined by a rising edge of one bit and a rising edge of another bit, the code is retained for a normal duration. In FIG. 7, gray codes 1 and 4 correspond to such a case. Similarly, when a gray code is defined by a falling edge of one bit and a falling edge of another bit, the code is retained for a normal duration. In FIG. 7, a gray code 6 corresponds to such a case.

However, when a gray code is defined by a falling edge of one bit and a rising edge of another bit, the code is retained for a duration longer than the normal duration. In FIG. 7, gray codes 0, 3, and 7 correspond to such a case.

Meanwhile, when a gray code is defined by a rising edge of one bit and a falling edge of another bit, the code is retained for a duration shorter than the normal duration. In FIG. 7, gray codes 2 and 5 correspond to such a case.

In a case where the gray code counter circuit outputs gray codes each having a distinct duration, if AD conversion is carried out using these gray codes as count signals, the relationship between the analog signals to be converted and the obtained digital data becomes non-linear. In other words, linearity of the AD conversion unit is degraded, and in turn the quality of an obtained image deteriorates.

Therefore, according to the present embodiment, the output of the counter 6 is synchronized with the second clock signal CLK2, and the synchronized count signal is supplied to the memory unit group 4.

Figure 8:
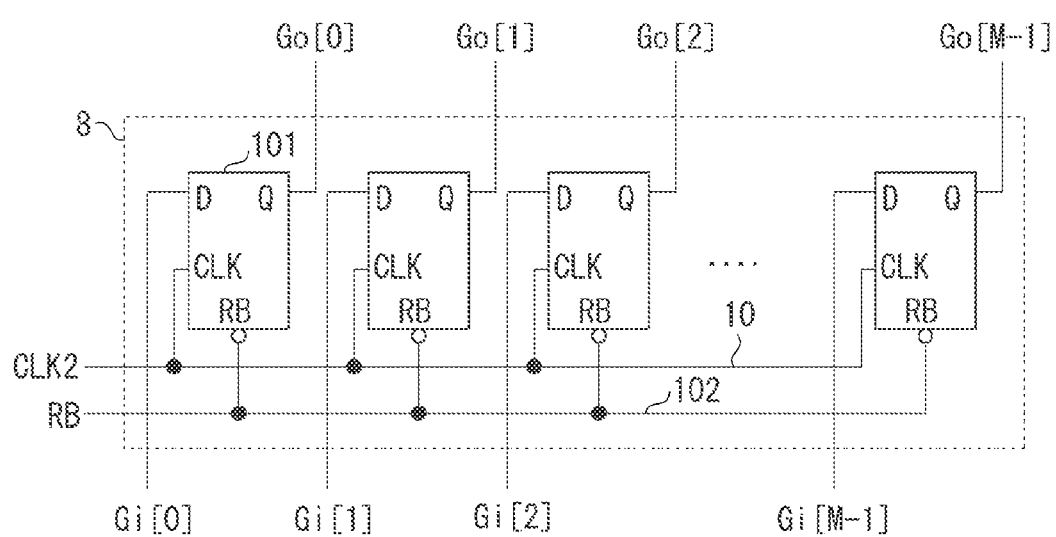
FIG. 8 illustrates a configuration of a synchronization unit.

FIG. 8 illustrates the configuration of the synchronization unit 8. The synchronization unit 8 includes M pieces of flip-flops 101. The common second clock signal CLK2 and a common reset signal RB are supplied to each of the flip-flops 101. When the reset signal RB is at the L level, outputs of the flip-flops 101 are reset. The bits of gray codes Gi[0:M−1] are given, respectively, to D terminals of the flip-flops 101. Then, Q terminals of the flip-flops 101 output, respectively, Go[0:M−1] as the synchronized count signals obtained by synchronizing the corresponding gray codes with the second clock signal CLK2.

Figure 9:
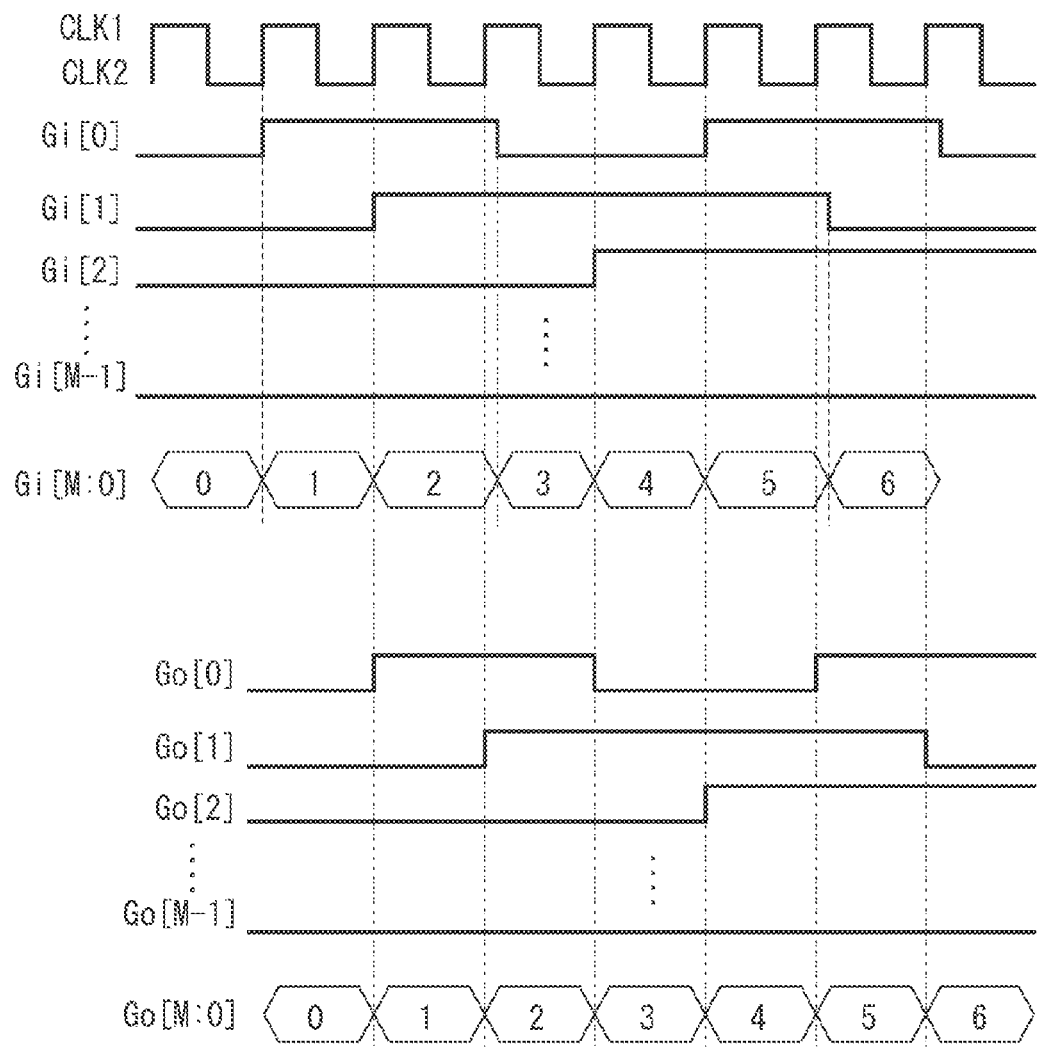
FIG. 9 is a timing chart for describing operations of a counter.

With reference to FIG. 9 and with continued reference to FIG. 8, a relationship between the outputs Gi[0:M−1] of the counter 6 and the synchronized count signals Go[0:M−1] will be described. To simplify the description, the first and second clock signals CLK1 and CLK2 are assumed to be in phase and have the same frequency.

The outputs Gi[0:M−1] of the counter 6 include a gray code that is output for a duration that is longer than the normal duration or for a duration that is shorter than the normal duration, as described above. However, if the outputs Gi[0:M−1] of the counter 6 are synchronized with the rises of the clock signals CLK1 and CLK2, synchronized count signals in which each code has an equal duration can be obtained. Providing such synchronized count signals to the memory unit group 4 makes it possible to suppress degradation of the linearity of the AD conversion unit.

Figure 10:
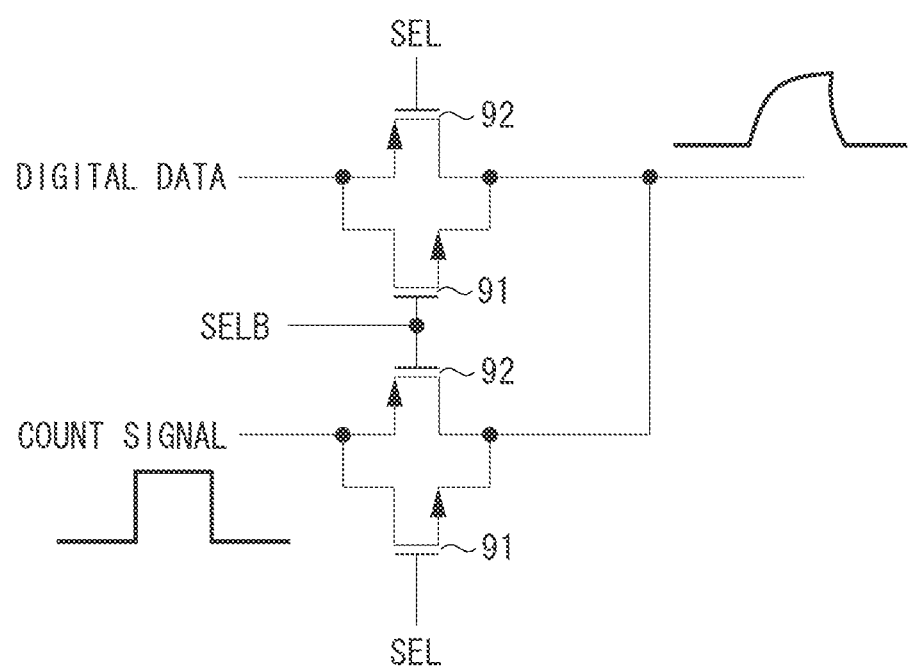
FIG. 10 illustrates a configuration of a selection unit.

The synchronization unit 8 can not only reduce a duty deviation of the count signal but also reduce a phase deviation thereof. FIG. 10 is a circuit diagram illustrating a configuration example of one of the bits in the selection unit 7.

The selection unit 7 illustrated in FIG. 10 includes a system to which a count signal is input and a system to which digital data is input. A complementary metal oxide semiconductor (CMOS) switch that includes an NMOS transistor 91 and a PMOS transistor 92 is provided in each of the systems, and the two CMOS switches are configured such that either one is turned on exclusively through a signal SEL and an inverted signal SELB thereof. The signal SEL and the inverted signal SELB are omitted in FIG. 1. If the NMOS transistor 91 and the PMOS transistor 92 each have distinct drive force due to, for example, a process variation at the time of manufacture, a duty deviation may occur in a signal output from the selection unit 7. In addition, if the amount of a duty deviation differs among the bits, a phase deviation may occur among the bits in a count signal output via the selection unit 7. Accordingly, in the configuration that includes the selection unit 7 as illustrated in FIG. 1, providing the synchronization unit 8 at a stage later than the selection unit 7 makes it possible to reduce a duty deviation or a phase deviation that may be caused by the selection unit 7.

According to the present embodiment, a case where the counter 6 is a gray code counter is described in detail. Alternatively, the counter 6 may, for example, be a binary code counter.

Figure 11A:
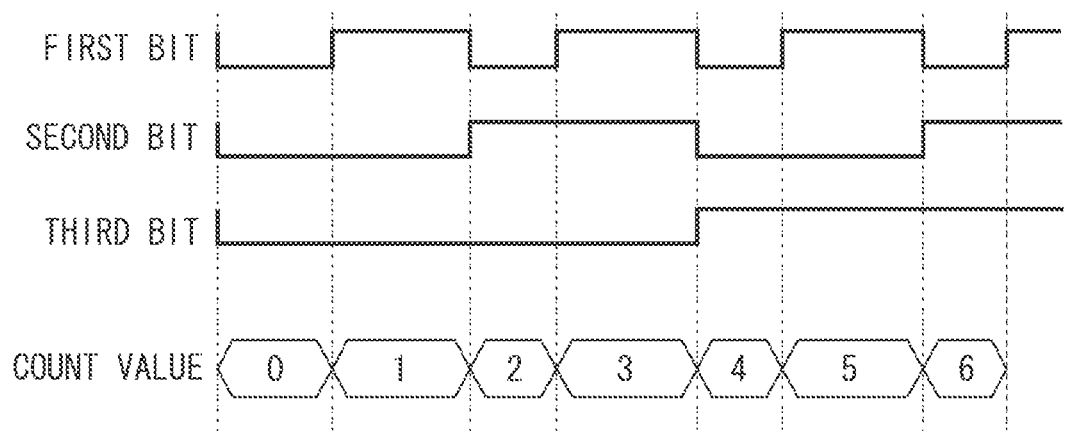
FIGS. 11A and 11B are diagrams for describing a duty deviation in a binary code counter circuit.

An influence of a duty deviation that occurs in a binary code counter will now be described. FIG. 11A is a timing chart illustrating count values in a case where a duty deviation has occurred in the least significant bit (first bit) and the duration of the H level is long in a three bit counter. A duty deviation has not occurred in a second bit and a third bit, and the second bit and the third bit make transitions at frequencies that are, respectively, half and quarter the frequency of the signal of the least significant bit in which a duty deviation has not occurred.

Figure 11B:
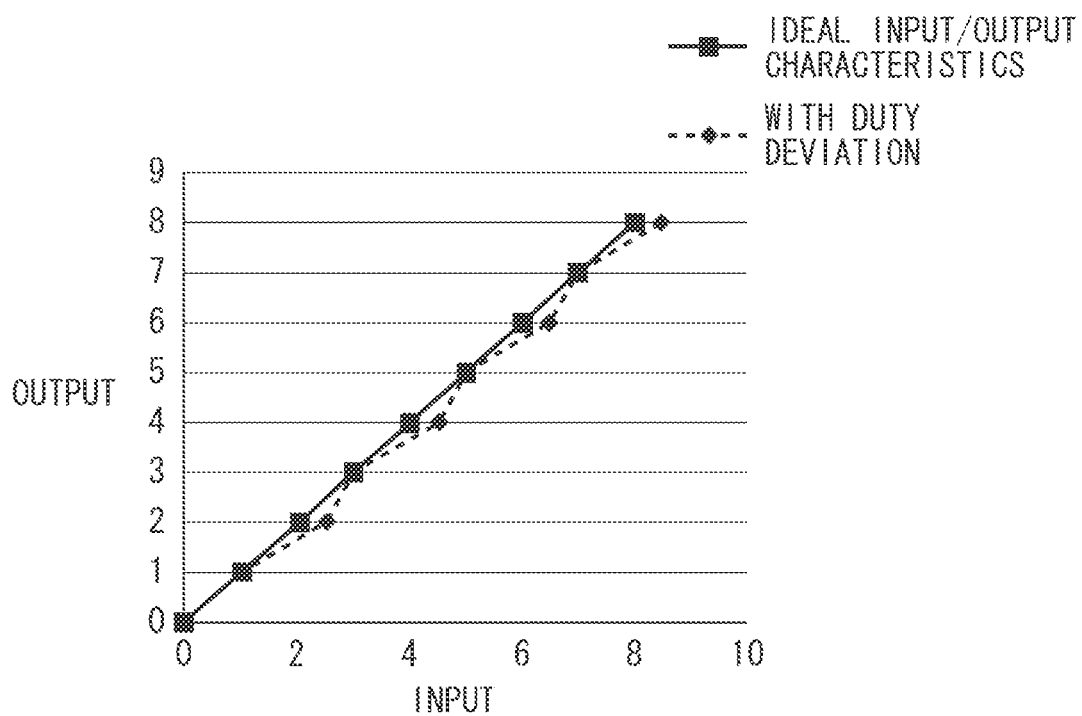

In this case, each of the durations in which count values 2, 4, and 6 are output is shorter than each of the durations in which the other count values are output. Input/output characteristics, under the above-described condition, of the AD conversion unit included in the photoelectric conversion device illustrated in FIG. 1 are illustrated in FIG. 11B. The horizontal axis corresponds to an analog signal to be converted, and the vertical axis corresponds to a digital signal that has undergone the AD conversion. Ideal input/output characteristics are indicated by a solid line, and input/output characteristics in a case where a duty deviation illustrated in FIG. 11A has occurred are indicated by a broken line. The input/output characteristics indicated by the broken like are deviated from the ideal input/output characteristics, which indicates that the linearity of the AD conversion unit is degraded.

As described above, even when the binary code counter is used as the counter 6, by providing the synchronization unit 8, a duty deviation can be reduced, and degradation of linearity of the AD conversion unit can be suppressed.

According to the present embodiment, the configuration is described in which the selection unit 7 selectively outputs, to the synchronization unit 8, the digital data 9 or the count signal output from the counter 6. Alternatively, even if the selection unit 7 and the digital data 9 are omitted from the configuration, a duty deviation among the bits of the count signal can be reduced.

According to the present embodiment, the example is described in which the synchronized count signal is generated in synchronization with a rising edge of the second clock signal CLK2. Alternatively, a falling edge of the second clock signal CLK2 may be used, or which edge of the second clock signal CLK2 to synchronize with may differ depending on a bit.

Further, although the first clock signal CLK1 and the second clock signal CLK2 differ from each other in the above description, the two clock signals may be identical. The first clock signal CLK1 is used to operate the counter 6, and thus if the frequency thereof is increased excessively, the counter 6 may not operate properly. Meanwhile, the second clock signal CLK2 is used to synchronize the count signal and can thus be set easily to a frequency that is higher than that of the first clock signal CLK1. For example, the second clock signal CLK2 may have a frequency that is 2n (n is a natural number) times the frequency of the first clock signal CLK1. As for the specific configuration, a frequency divider may be provided, and a clock signal obtained by dividing the second clock signal CLK2 in 1/(2n) may be used as the first clock signal CLK1.

As described above, according to the present embodiment, a duty deviation can be reduced.

A second embodiment will be described with a focus on points that differ from those of the first embodiment.

Figure 12:
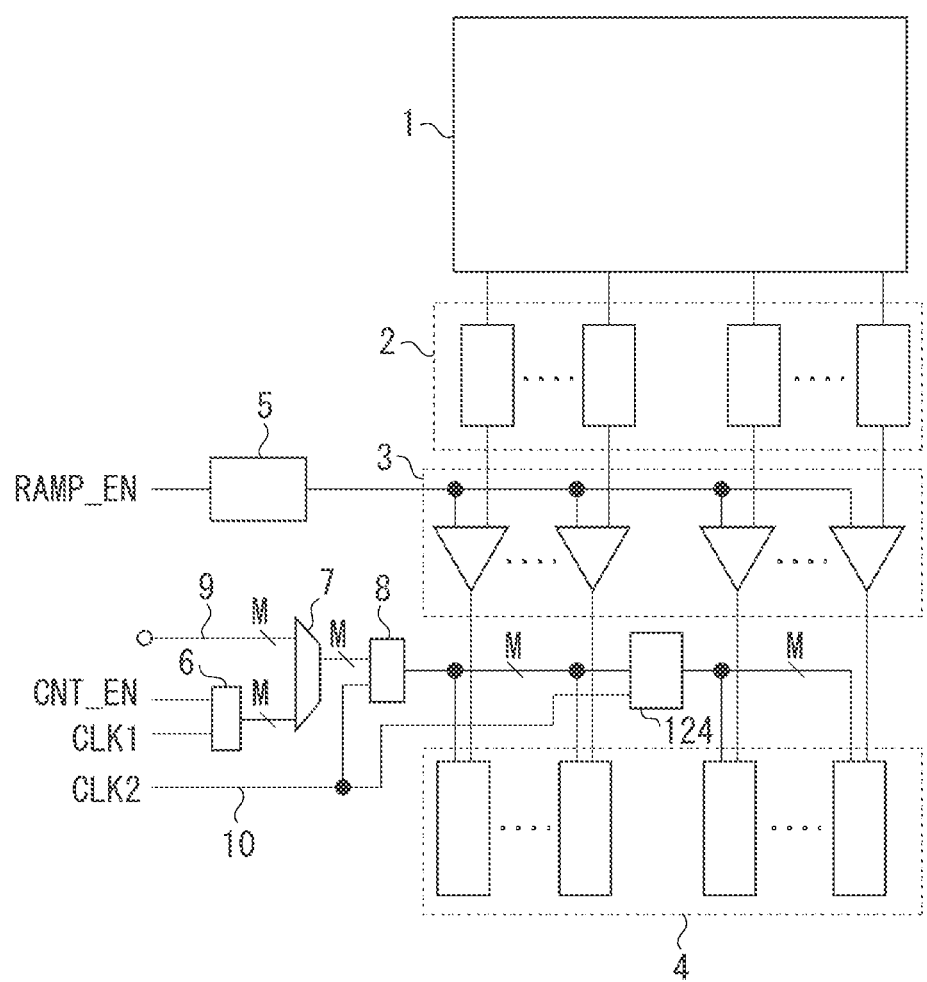
FIG. 12 illustrates a configuration of a photoelectric conversion device.

FIG. 12 is a block diagram illustrating a configuration of a photoelectric conversion device according to the second embodiment. The configuration differs from the configuration illustrated in FIG. 1 in that a second synchronization unit 124 is further provided. According to the present embodiment, the second synchronization unit 124 further synchronizes a synchronized count signal output from the synchronization unit 8 serving as a first synchronization unit with the second clock signal CLK2 and outputs the resulting signal.

As the number of columns in the pixel array 1 increases, wires for transmitting the synchronized count signal output from the synchronization unit 8 are extended accordingly. Then, the parasitic resistance and the parasitic capacitance of these wires also increase, which causes a duty deviation in a synchronized count signal or a phase deviation among bits to occur more easily. Accordingly, with the configuration as in the present embodiment, even if the number of columns in the pixel array 1 increases, a duty deviation in a synchronized count signal can be reduced.

Figure 13:
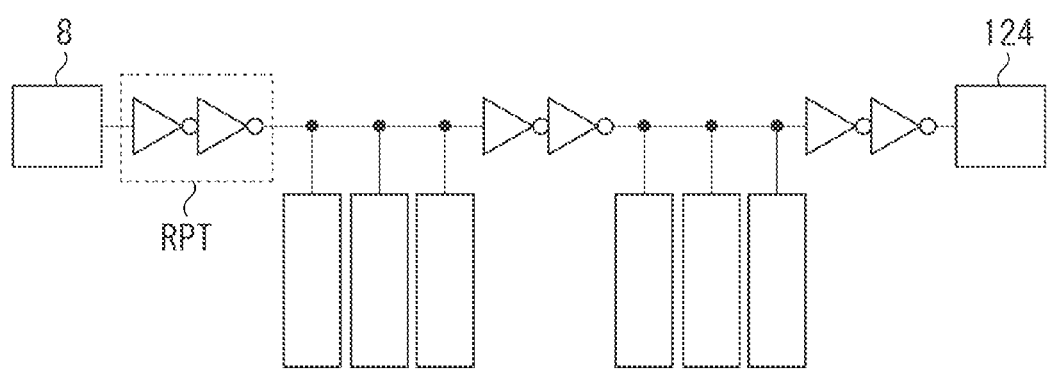
FIG. 13 illustrates a configuration of a transmission path of a synchronized count signal.

Providing a repeat buffer for transmitting a synchronized count signal can be considered as well. FIG. 13 illustrates an exemplary configuration of a path for transmitting one bit's worth of a synchronized count signal output from the synchronization unit 8. As illustrated in FIG. 13, a repeater RPT serving as a repeat buffer is provided in a transmission path, and an output of the repeater RPT is supplied to the memory unit group 4 as the synchronized count signal. The repeater RPT may, for example, be formed by a two-stage inverter, and a variation in drive force between an NMOS transistor and a PMOS transistor forming the inverter may cause a duty deviation among the bits or a phase deviation among the bits to occur. Providing the second synchronization unit 124 makes it possible to reduce a duty deviation or a phase deviation that is caused by the repeater RPT.

According to the present embodiment, the single second synchronization unit 124 is provided. Alternatively, the second synchronization unit 124 may be provided in a plurality.

Figure 14:
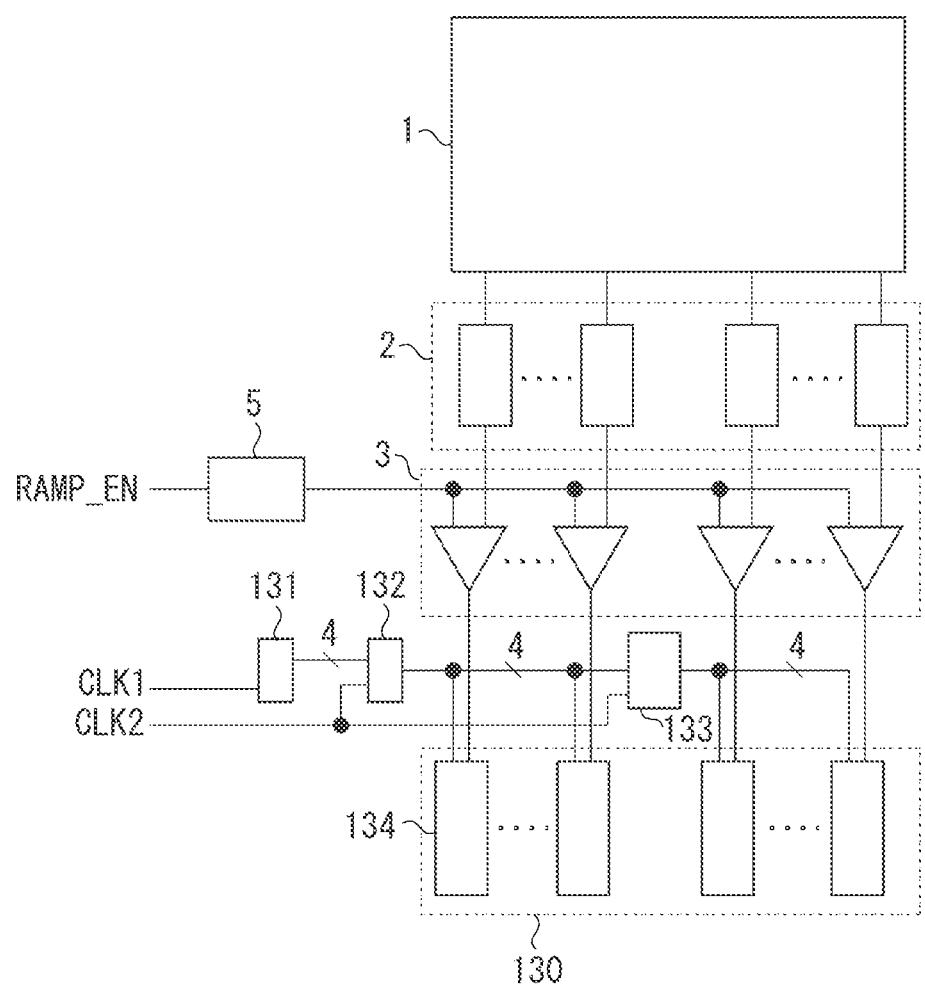
FIG. 14 illustrates a configuration of a photoelectric conversion device.

With reference to FIG. 14, a photoelectric conversion device according to a third embodiment will be described with a focus on points that differ from those of the first embodiment.

The photoelectric conversion device according to the present embodiment includes a digital signal generation unit group 130 in place of the memory unit group 4 and a clock signal generation unit 131 in place of the counter 6. In addition, in the photoelectric conversion device according to the present embodiment, a first synchronization unit 132 and a second synchronization unit 133 synchronize a clock signal output from the clock signal generation unit 131 with a second clock signal CLK2 and output a synchronized clock signal. According to the present embodiment, the clock signal generation unit 131 receives a first clock signal CLK1 and generates four clock signals that are out of phase with one another. Each of the first and second synchronization units 132 and 133 may have a configuration similar to that illustrated in FIG. 8. However, a difference lies in that the signal provided to each flip-flop 101 as the output of the counter 6 corresponds to a clock signal provided from the clock signal generation unit 131.

Figure 15:
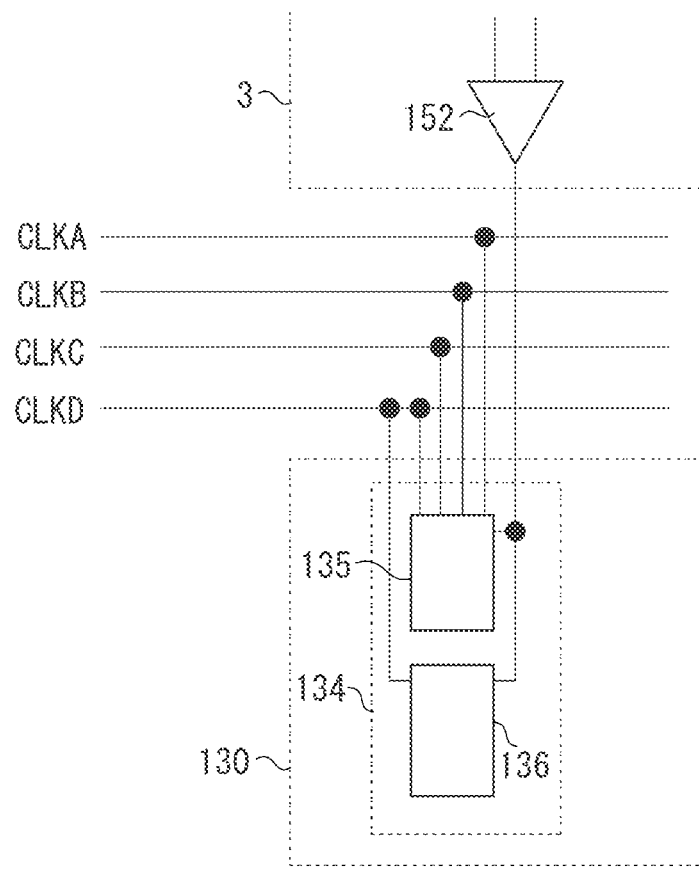
FIG. 15 illustrates a configuration of a portion of the photoelectric conversion device.

FIG. 15 illustrates a portion of the comparison unit group 3 and a portion of the digital signal generation unit group 130 corresponding to one of the columns in the pixel array 1.

A digital signal generation unit 134 includes a latch and decode unit 135 that includes a latch circuit and a decode circuit and a counter 136. The latch and decode unit 135 receives four synchronized clock signals CLKA to CLKD and an output of the comparison unit as input signals, and the latch circuit latches the synchronized clock signals CLKA to CLKD in response to a change in the output of the comparison unit. The latched synchronized clock signals CLKA to CLKD are decoded by the decode circuit and are output as decode values. The counter 136 receives the synchronized clock signal CLKD and the output of the comparison unit as input signals and carries out a count operation in accordance with the synchronized clock signal CLKD. As the output of the comparison unit changes, the counter 136 stops the count operation and stores a count value at that point.

Figure 16:
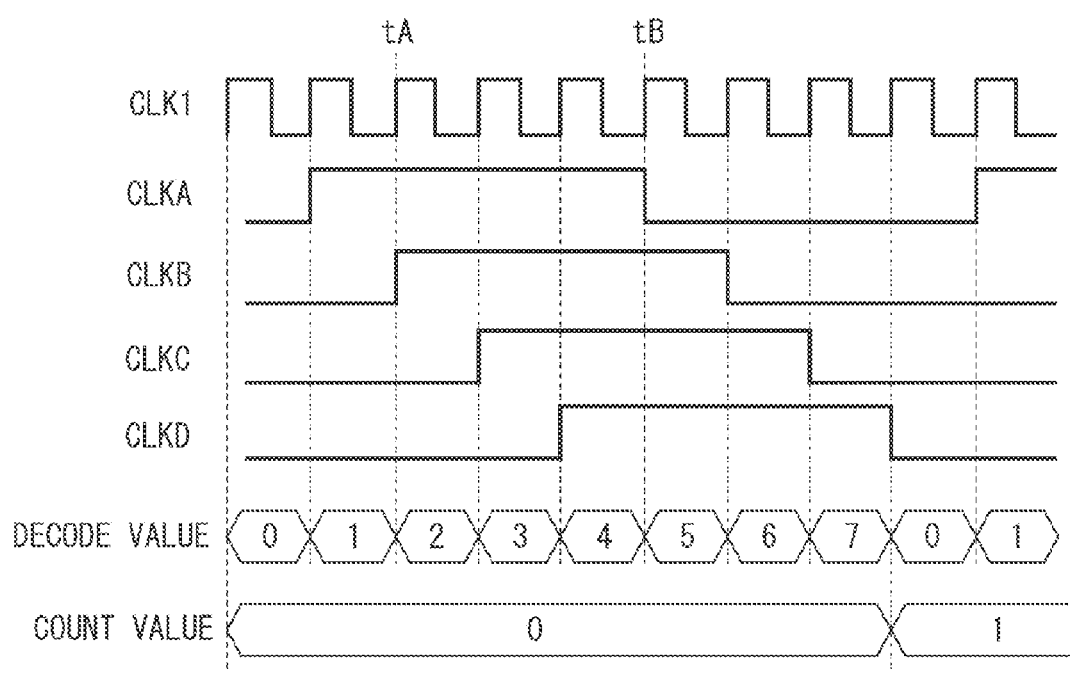
FIG. 16 is a timing chart illustrating operations of a digital signal generation unit.

FIG. 16 is a timing chart illustrating exemplary operations of the latch and decode unit 135 and the counter 136. The synchronized clock signals CLKA to CLKD are out of phase with one another by 45 degrees and each has a cycle that is equivalent to eight cycles in the first clock signal CLK1.

The counter 136 carries out the count operation in accordance with the synchronized clock signal CLKD, whereas the latch and decode unit 135 receives the synchronized clock signals CLKA to CLKD. Thus, while the counter 136 has a single count, the latch and decode unit 135 may have eight outputs. If the digital signal generation unit 134 includes only the counter 136, only a count value of "0" can be obtained even if the output of the comparator changes at a time tA or at a time tB. However, with the configuration as in the present embodiment, since the outputs of the latch and decode unit 135 differ between the time tA and the time tB, the count value "0" can be expressed at higher resolution.

According to the present embodiment described thus far, as the count signal generated by the clock signal generation unit 131 is synchronized with the second clock signal CLK2 by the first synchronization unit 132, a duty deviation or a phase deviation in the clock signal can be reduced. Accordingly, degradation of linearity of the output characteristics relative to an amount of light incident on the photoelectric conversion device can be suppressed.

According to the present embodiment, the configuration as follows is described. That is, the second synchronization unit 133 is provided. Then, the first synchronization unit 132 provides the synchronized clock signals to a part of the digital signal generation units 134, and the second synchronization unit 133 provides the synchronized clock signals to another part of the digital signal generation units 134. Alternatively, the clock signals output from the first synchronization unit 132 may be provided to the entire digital signal generation units 134, or the outputs of the first synchronization unit 132 may be provided to the digital signal generation unit group 130 via a repeater.

According to the present embodiment as well, similarly to the embodiments described above, the frequency of the second clock signal CLK2 can be set to a frequency that is higher than the frequency of the first clock signal CLK1. The second clock signal CLK2 may have a frequency that is 2n times the frequency of the first clock signal CLK1, and such a relationship may be realized using a frequency divider as in the embodiments described above.

Further, the counter 136 included in each digital signal generation unit 134 may be either a binary code counter or a gray code counter.

Figure 17:
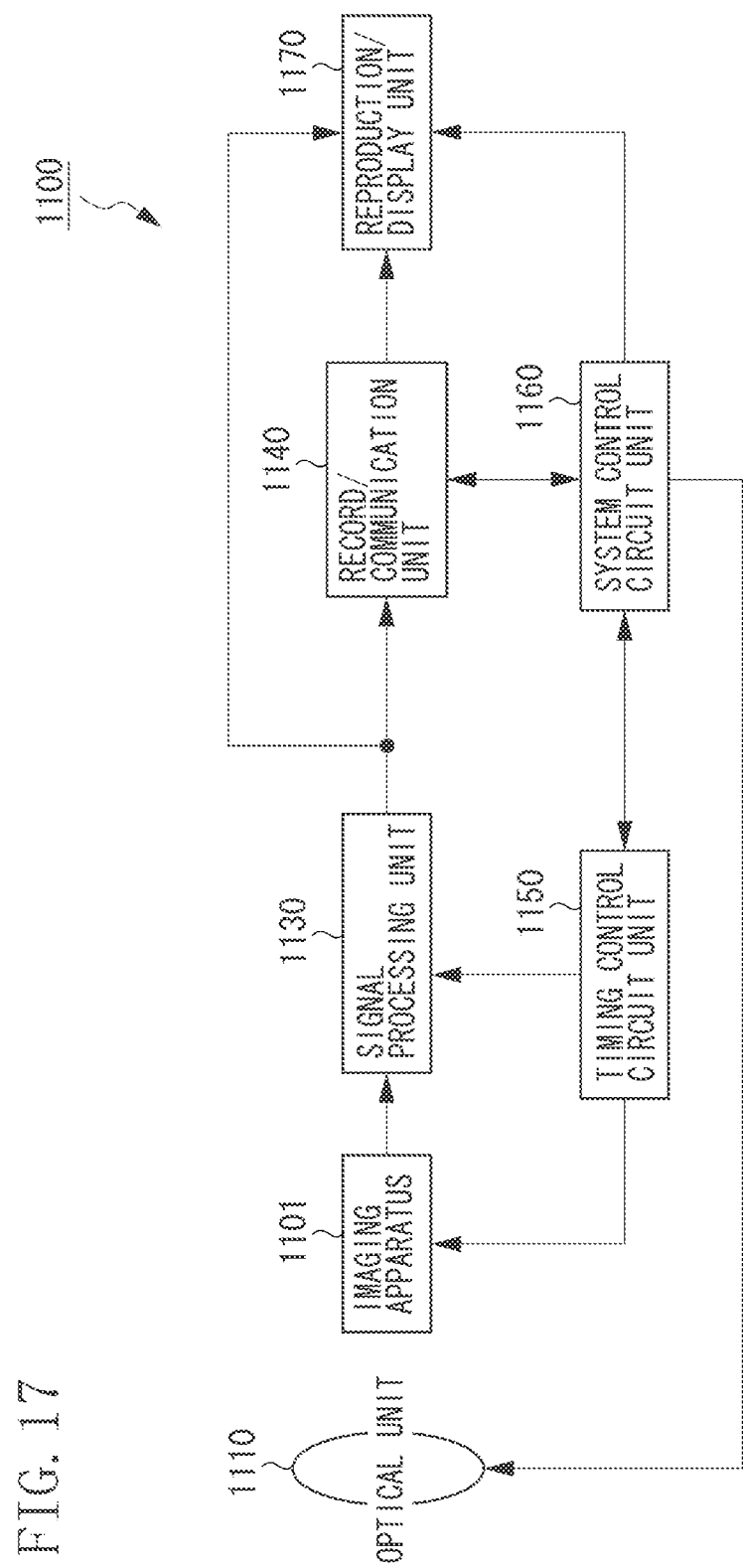
FIG. 17 illustrates a configuration of an imaging system.

A fourth embodiment of the present invention will now be described. FIG. 17 schematically illustrates a configuration of an imaging system.

An imaging system 1100 includes, for example, an optical unit 1110, an imaging apparatus 1101, a signal processing unit 1130, a record/communication unit 1140, a timing control circuit unit 1150, a system control circuit unit 1160, and a reproduction/display unit 1170. The photoelectric conversion device 100 described in the preceding embodiments is used as the imaging apparatus 1101. The signal processing unit 1130 may, for example, be provided with functions of the circuits that are provided in later stages in the photoelectric conversion device 100 described in the second embodiment.

The optical unit 1110 that includes an optical system such as a lens is arranged to form an image of light from an object onto a pixel array of the imaging apparatus 1101 in which a plurality of pixels is arranged two-dimensionally, to thereby form an image of the object. The imaging apparatus 1101 outputs a signal that corresponds to the light that has been imaged on the pixel array in accordance with a timing of a signal from the timing control circuit unit 1150.

The signal output from the imaging apparatus 1101 is input to the signal processing unit 1130 serving as a video signal processing unit, and the signal processing unit 1130 carries out processing such as correction on the input electrical signal in accordance with a method defined by a program or the like. A signal obtained through the processing by the signal processing unit 1130 is transmitted to the record/communication unit 1140 in the form of image data. The record/communication unit 1140 transmits a signal for forming an image to the reproduction/display unit 1170 and causes the reproduction/display unit 1170 to reproduce and display a moving image or a still image. The record/communication unit 1140 communicates with the system control circuit unit 1160 in response to a signal from the signal processing unit 1130 and also records a signal for forming an image into a recording medium (not illustrated).

The system control circuit unit 1160 controls the overall operations of the imaging system 1100 and controls driving of the optical unit 1110, the timing control circuit unit 1150, the record/communication unit 1140, and the reproduction/display unit 1170. Further, the system control circuit unit 1160 includes a storage device (not illustrated) such as a recording medium, and programs that are necessary for controlling the operations of the imaging system 1100 are recorded on the storage device. The system control circuit unit 1160 also supplies, within the imaging system 1100, a signal for switching a drive mode in response to, for example, a user operation. Specific examples include changing which row to read from or to reset, changing an angle of view in association with an electronic zoom, and shifting an angle of view in association with electronic image stabilization.

The timing control circuit unit 1150 controls drive timings of the imaging apparatus 1101 and the signal processing unit 1130 based on the control of the system control circuit unit 1160 serving as a control unit.

The embodiments described above are merely examples, and modifications can be made as appropriate within the scope and the spirit of the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2012-223307 filed Oct. 5, 2012, which is hereby incorporated by reference herein in its entirety.

What is claimed is:

1. A photoelectric conversion device, comprising:
   a plurality of pixels arranged in a plurality of columns;
   a plurality of comparators provided correspondingly to the respective columns, each receiving a reference signal;

a counter configured to generate a count signal that includes a plurality of bits, in synchronization with a first clock signal;

a synchronizer connected to a plurality of bit lines carrying the plurality of bits of the count signal, and configured to synchronize the plurality of bits with a second clock signal to generate a synchronized count signal and to output the generated synchronized count signal; and a plurality of memories provided correspondingly to the respective comparators, the memories each being configured to store the synchronized count signal from the synchronizer in response to a change in an output of the corresponding one of the comparators.

2. The photoelectric conversion device according to claim 1, further comprising:

a second synchronizer configured to synchronize the synchronized count signal output from the synchronizer with the second clock signal and to output a resulting signal, wherein the synchronized count signal output from the synchronizer is supplied to a part of the plurality of memories and the output of the second synchronizer is supplied to another part of the plurality of memories.

3. The photoelectric conversion device according to claim 1, wherein the counter is a gray code counter that outputs a gray code as the count signal.

4. The photoelectric conversion device according to claim 1, wherein the counter is a binary code counter that outputs a binary code as the count signal.

5. The photoelectric conversion device according to claim 1, wherein the synchronizer includes a flip-flop.

6. An imaging system, comprising:

a photoelectric conversion device according to claim 1;

an optical system configured to form an image on a pixel array that includes the plurality of pixels; and a signal processing unit configured to process a signal output from the photoelectric conversion device to generate image data.

7. The photoelectric conversion device according to claim 1, further comprising:

a clock signal line configured to supply the second clock signal, wherein the synchronizer includes a plurality of flip-flops, and the clock signal line is connected to the plurality of flip-flops.

8. The photoelectric conversion device according to claim 1, wherein the count signal includes a plurality of signals respectively representing the plurality of bits and having different phases and/or different periods from each other.

9. The photoelectric conversion device according to claim 1, further comprising:

a data supplier configured to supply digital data; and a selector, wherein the selector selectively outputs the digital data or the count signal to the synchronizer.

10. The photoelectric conversion device according to claim 9, wherein the digital data is data that corresponds to the maximum value to be output from the counter.

11. The photoelectric conversion device according to claim 1, wherein the second clock signal has a frequency that is higher than a frequency of the first clock signal.

12. The photoelectric conversion device according to claim 11, wherein the frequency of the second clock signal is 2n times the frequency of the first clock signal, n being a natural number.

13. The photoelectric conversion device according to claim 1, wherein the counter includes a binary counter circuit having a plurality of outputs, and a plurality of exclusive OR circuits, at least one of the plurality of exclusive OR circuits is connected to two of the plurality of outputs corresponding to adjacent bits.

14. The photoelectric conversion device according to claim 13, wherein the binary counter circuit carries out a count operation in response to the first clock signal.

15. The photoelectric conversion device according to claim 14, wherein one of the plurality of exclusive OR circuits is connected to one of the plurality of outputs and a ground node.

16. The photoelectric conversion device according to claim 15, wherein each of the plurality of exclusive OR circuits includes a plurality of invertors and a plurality of switches.

17. A photoelectric conversion device, comprising:

a plurality of pixels arranged in a plurality of columns;

a plurality of comparators provided correspondingly to the respective columns, each receiving a reference signal;

a plurality of digital signal generator provided correspondingly to the respective comparators;

a clock signal generator configured to generate a plurality of clock signals that are out of phase with one another; and a synchronizer configured to synchronize the plurality of clock signals with a second clock signal to generate a plurality of synchronized clock signals and to output the generated synchronized clock signals, wherein each of the plurality of digital signal generation units includes a counter configured to receive the plurality of synchronized clock signals from the synchronizer and to carry out a count operation in response to the plurality of synchronized clock signals.

18. An imaging system, comprising:

a photoelectric conversion device according to claim 17;

an optical system configured to form an image on a pixel array that includes the plurality of pixels; and a signal processing unit configured to process a signal output from the photoelectric conversion device to generate image data.

19. The photoelectric conversion device according to claim 17, further comprising:

a clock signal line configured to supply the second clock signal, wherein the synchronizer includes a plurality of flip-flops, and the clock signal line is connected to the plurality of flip-flops.

* * * * *